United States Patent
Evans

(10) Patent No.: US 7,125,507 B2
(45) Date of Patent: Oct. 24, 2006

(54) TRI-CUP WINDSHIELD REPAIR TOOL

(76) Inventor: Tim D. Evans, 20225 True Vista Cir., Monument, CO (US) 80132

( * ) Notice: Subject to any disclaimer, the term of this patent is extended or adjusted under 35 U.S.C. 154(b) by 279 days.

(21) Appl. No.: 10/265,496

(22) Filed: Oct. 7, 2002

(65) Prior Publication Data

US 2004/0067272 A1    Apr. 8, 2004

(51) Int. Cl.
*B29C 73/16* (2006.01)
(52) U.S. Cl. ............... 264/36.21; 425/11; 425/12
(58) Field of Classification Search ............ 425/11, 425/12; 264/36.21; 156/105
See application file for complete search history.

(56) References Cited

U.S. PATENT DOCUMENTS

| | | | | |
|---|---|---|---|---|
| 4,775,305 A | * | 10/1988 | Alexander et al. ............ | 425/12 |
| 4,814,185 A | * | 3/1989 | Jones ............................ | 425/12 |
| 5,234,325 A | * | 8/1993 | Hill .............................. | 425/12 |
| 5,407,338 A | * | 4/1995 | Callahan et al. .............. | 425/12 |
| 5,622,726 A | * | 4/1997 | Tanner ......................... | 425/12 |
| 5,643,609 A | * | 7/1997 | Jan .............................. | 425/12 |
| 5,670,180 A | * | 9/1997 | Mackey et al. ............... | 425/11 |
| 5,948,331 A | * | 9/1999 | Beckert et al. .......... | 264/36.21 |
| 5,954,901 A | * | 9/1999 | Henderson .................... | 156/94 |
| 6,033,507 A | * | 3/2000 | Campfield .................... | 156/94 |

* cited by examiner

*Primary Examiner*—Duane Smith
*Assistant Examiner*—Emmanuel S. Luk
(74) *Attorney, Agent, or Firm*—G. F. Gallinger

(57) ABSTRACT

In windshield crack repair it is necessary to move a repair tool alongside a crack and manipulate a resin injection head to remain in close proximity to the crack at all times. A three cupped tool is disclosed which exhibits here before unavailable lateral and longitudinal stability even when one of the cups becomes unadhered to the windshield. The tool comprises an elongate frame having an upright injection head attachment means on one end; an upright frame height adjustment means on the other opposite end; and, a central portion having three suction cups, each having an upright axis, and each oriented for attachment to the windshield. In a preferred aspect of this tool the axis of a suction cup closest to the injection head generally is in alignment with an elongate axis of the elongate frame and the upright axis of the other two cups are offset similar amounts from the axis of the elongate frame. This arrangement facilitates visibility and manipulation of the injection head along a crack in a windshield.

9 Claims, 1 Drawing Sheet

TRI-CUP WINDSHIELD REPAIR TOOL

FIELD OF THE INVENTION

This invention relates to tools used to repair cracks and chips in vehicle windshields. More particularly this invention relates to a more stable repair tool utilizing three suction cups.

BACKGROUND OF THE INVENTION

U.S. Pat. Des. 350,684, issued to R. A. Campfield disclosed a windshield repair tool used to hold and position a resin injection head along the length of a crack in a windshield. One problem with this tool is that lateral stability with a single large suction cup mandated the use of two laterally spaced pressure adjustment bolts on one end of the frame in order to maintain the opposite end holding the injection head generally perpendicular to the windshield. In this tool the suction cup may be conveniently held beneath the palm of one's hand and moved along the crack. It is convenient to follow a sharply turning crack. Another problem with this single suction cup tool is it is not possible to maintain sufficient downward pressure to inject resin into the tightly closed portion of a crack. However, it is inconvenient to equally adjust two bolts over varying slopes as the tool is moved along the crack in the windshield.

U.S. Pat. No. 5,589,018 disclosed a repair tool utilizing two perpendicularly disclosed arms. One of the arms has suction cups on opposite end portions. The other arm is adapted to hold an injection head on one end and a single pressure adjustment bolt on the other opposite end portion. Utilization of two suction cups provided sufficient lateral stability to enable pressure to be conveniently adjusted with a single bolt thereby simplifying use. One problem with this design however, was longitudinal instability. Another problem is that the large separation between the cups, and the close proximity of the injection head to the cups usually mandates that in use one straddle the crack being repaired. It is not possible to follow a crack which turns toward the tool when the widely separated suction cups are adjacent to the crack on the same side of the crack. If a suction cup is moved over the crack suction is lost. Loss of suction in one of the two cups when moving over a crack or chip could cause the injection head to separate from the crack. What is worse is that if the suction cup lubricant penetrates the crack, then it is not possible for the resin to properly bond in the crack.

Additionally, widely separated suction cups mandates a greater distance between those cups and the injection head. This greater distance is required to follow a bending crack in a windshield without passing the suction cup over the crack. A greater distance between the injection head and the suction cups means less leverage and a smaller possible downward force on the injection head. This greater distance also mandates greater downward pressure exerted by the adjusting bolt to maintain comparable downward pressure on the crack by the injection head. If this tool is used with its suction cups straddling the crack then the force exerted by the single bolt is exerted on the injected crack causing it to separate. This separation causes air pockets to form in the crack resulting in an unsatisfactory bond.

On a typical crack which runs along closely beside the edge of a windshield before terminating at the edge, the inventor has found that it was advantageous to use the single cup tool on the portion of the crack at the edge of the window, and that it was advantageous to use the dual suction cup tool on the portion of the crack terminating in the central portion of the windshield. On the portion of the crack terminating in the central portion of the windshield it was advantageous to use the dual suction cup tool because with the dual suction cup tool more pressure could be exerted on the injection head. This greater pressure was needed in order to inject the tightly closed portion of the crack. On the portion of the crack terminating at the edge of the windshield, the dual suction cup tool could not typically be used either because there was insufficient room between the windshield edge and the crack to position the crack between the dual suction cups; or alternatively, the crack turned too sharply for use of this tool. What is needed is a better tool, one which can exert greater injection head pressure, follow a sharply turning crack, and seat wholly on a single side of the crack so that it could follow the crack all the way to the edge of the windshield.

OBJECTS OF THE INVENTION

It is an object of this invention to disclose a fully self levelling windshield repair tool. It is an object of this invention to disclose a windshield repair tool which will maintain an injection head in contact with a crack even if one suction cup becomes unadhered to a windshield. It is yet a further object of this invention to disclose a repair tool having a relatively small suction cup which can be positioned relatively closely to the injection head and still facilitate easily guided movement along a curving crack. It is a final object of this invention to disclose a repair tool which facilitates injecting cracks which follow closely along an edge of the windshield and which terminate in a central portion of a windshield.

One aspect of this invention provides for a windshield crack repair tool for moving an injection head along, in close proximity to, a crack in a windshield comprising: an elongate frame having an upright injection head attachment means on one end; an upright frame height adjustment means on the other opposite end; and, a central portion having three suction cups, each having an upright axis, and each oriented for attachment to the windshield. The frame is largely maintained in a laterally and longitudinally stable position on the windshield by the suction cups when the suction cups are adhered to the windshield.

In a preferred aspect of this tool the axis of a suction cup closest to the injection head generally is in alignment with an elongate axis of the elongate frame and the upright axis of the other two cups are offset similar amounts from the axis of the elongate frame. This arrangement facilitates visibility and manipulation of the injection head along a crack in a windshield.

Various other objects, advantages and features of this invention will become apparent to those skilled in the art from the following description in conjunction with the accompanying drawings.

FIGURES OF THE INVENTION

Figure 1:
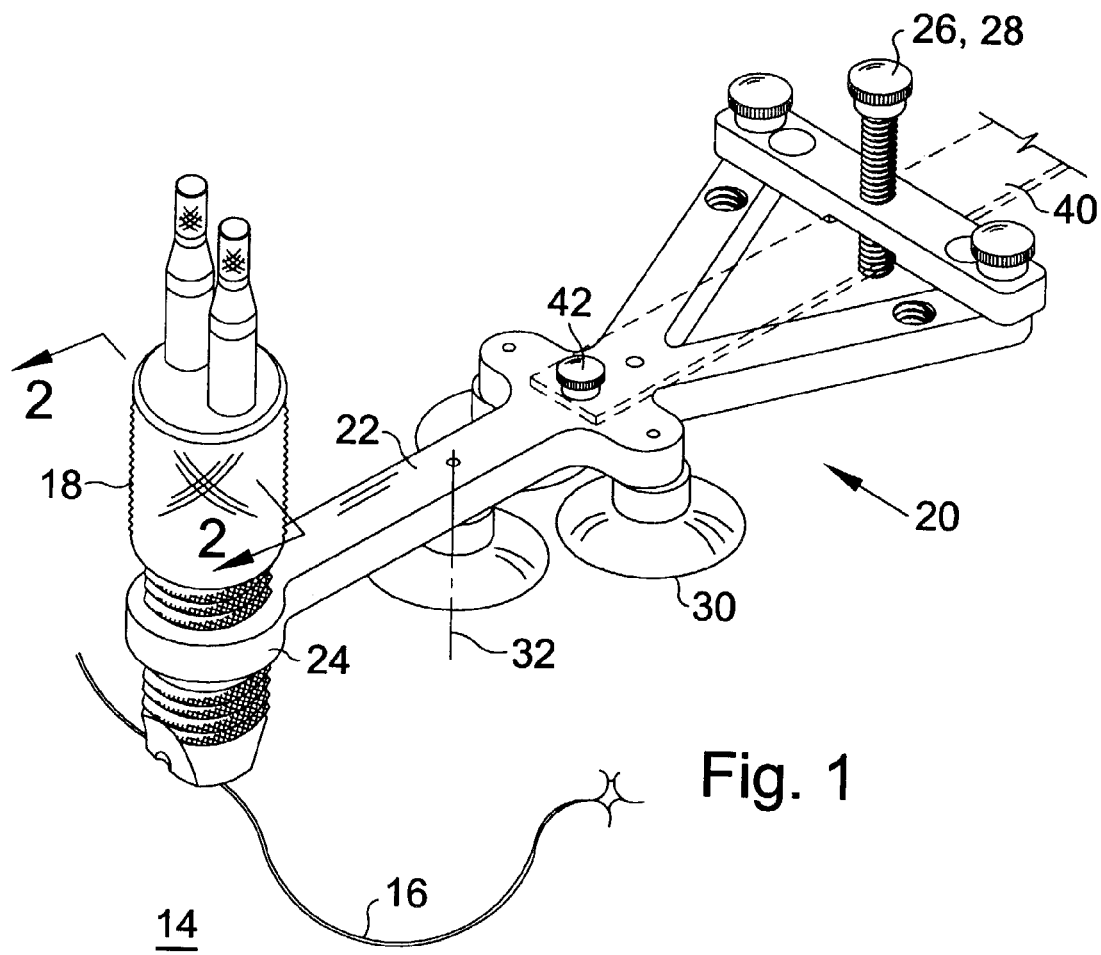
FIG. 1 is a perspective view of a tri-cup windshield repair tool.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a tri-cup windshield repair tool 20. The windshield crack repair tool 20 is used for moving an injection head 18 along, in close proximity to, a crack 16 in a windshield 14. The tool 20 comprises: an elongate frame 22 having an upright injection head attachment means 24 on one end; an upright frame height adjustment means 26 on the other opposite end; and, a central portion having three suction cups 30, each having an upright axis 32, and each oriented for attachment to the windshield 14. The frame 22 is largely maintained in a laterally and longitudinally stable position on the windshield 14 by the suction cups 30 when the suction cups 30 are adhered to the windshield 14.

Most all long cracks 16 abruptly turn making them nearly impossible to repair with existing tools. Existing tools generally straddle cracks and are thereby unable to be positioned on both sides of the sharply turning crack. If a lubricated suction cup 30 inadvertently passes over an unrepaired crack 16, the lubricant penetrates the crack 16 and forever thereafter prevents adhesion of the repair epoxy in the crack. The windshield is then ruined for repair purposes.

Figure 2:
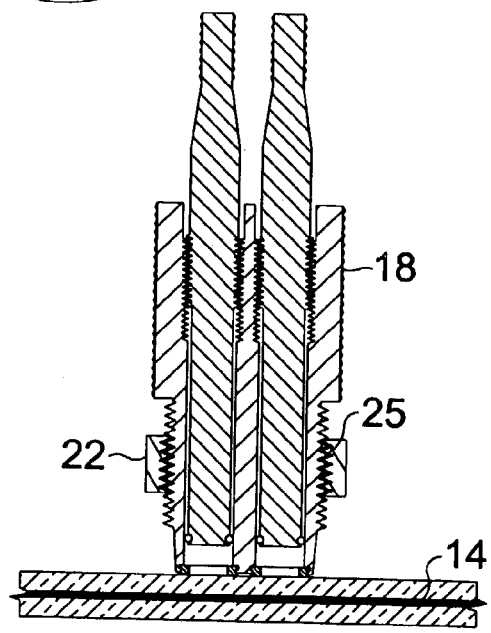
FIG. 2 is a cross sectional view of the dual viscosity injection head shown in FIG. 1.

In the most preferred embodiment of the invention, the upright axis 32 of a suction cup 30 closest to the injection head 18 generally is in alignment with an elongate axis of the elongate frame 22 and the upright axis 32 of the other two cups 30 are offset similar amounts from the axis of the elongate frame. The frame height adjustment means 26 comprises a screw 28 and the injection head attachment means 24 comprises an internal thread 25 in the frame 22. The internal thread 25 is best shown in FIG. 2, a cross sectional view of the dual viscosity resin injection head 18 shown in FIG. 1. The tri-cup windshield repair tool 20 is particularly effective when using a dual injection head 18. A single hand can guide the tool 20 to position the injection head 18 along the most curvaceous of cracks 16. On all but the most curved of windshields 14 the three cups 30 maintain sufficient longitudinal stability to maintain the injection head 18 in close proximity to the crack 16 without the need for subsequent frame height adjustment after the initial frame height adjustment has been made. Thus a user holds and moves the tool 20 along the crack 16 with a single hand and has his other hand fully available to guide and feed the dual viscosity resin injection head 18.

When compared to the cups 30 generally used in existing crack repair tools, the plastic cups 30 used in this invention and have minimal coefficients of friction. The three cups together slide along a windshield 14 with no more resistance to sliding than a tool with a larger single cup 30. It also should be noted that the smaller cups 30 employed herein elevate the frame 22 generally a height above the windshield 14 which is about one half the height which the generally accepted larger cups elevate the frame 22 above the windshield 14. This reduced frame height substantially reduces the potential of the frame 22 to tip with respect to the plane of the windshield 14.

In a preferred embodiment of the invention, an arm 40 is provided for removable attachment to the frame 22. This removable arm 40 is used for reaching a windshield crack 16 in a central portion of a windshield 14. Most preferably the arm 40 is attached to the frame with two threaded bolts 42 adapted for hand tightening and removal. In the most preferred embodiment of the invention arms 40 are provided in varying lengths for reaching varying distances. It has been found that arms having lengths of 12", 18", and 24" are useful. These arms are particulary advantageous when it is necessary to press the inside of a windshield 14 to open a crack 16 and concurrently move the tool 20 on a central portion of the exterior of the windshield 14. In yet an alternative embodiment of the invention the arm 40 may telescope in length between generally one and two feet in length.

While the invention has been described with preferred specific embodiments thereof, it will be understood that this description is intended to illustrate and not to limit the scope of the invention, which is defined by the following claims.

I claim:

1. A method of repairing a long sharply turning crack in a windshield comprising the steps of:
   providing a crack repair tool having an elongate frame having a central portion having three suction cup; each having an upright axis, and each oriented for attachment to the windshield; an injection head on one end, substantially spaced along the frame from the central portion having the three suction cups; and, an upright frame height adjustment means on the other opposite end;
   lubricating the suction heads to facilitate attachment to and movement along the crack;
   positioning the tool so that the injection head is seated on and above the crack and the suction cups are all seated to a same side of the crack on the windshield, thereby providing substantial space between the turning crack and the injection heads; and,
   moving the injection head and tool along the crack;
   whereby the three suction heads act in concert to provide sufficient stability to the injection head even when spaced substantially therefrom, said substantial space safely accommodating sharp turns in the crack without the risk of ruining the windshield by passing the lubricated cups over the uninjected crack.

2. A method as in claim 1 wherein the axis of a suction cup closest to the injection head generally is in alignment with an elongate axis of the elongate frame thereby maintaining maximum turning moment adjacent to the crack, and wherein the upright axis of the other two cups are offset similar amounts from the axis of the elongate frame.

3. A method as in claim 2 wherein the frame height adjustment means comprises a screw and wherein the injection head attachment means comprises an internal thread in the frame.

4. A method as in claim 3 wherein the internally threaded opening has a diameter sufficient to accommodate a dual viscosity resin injection head.

5. A method as in claim 3 wherein the cups are plastic and have minimal coefficients of friction.

6. A method as in claim 3 further comprising a arm for removable attachment to the frame for reaching a windshield crack in a central portion of a windshield.

7. A method as in claim 6 further two threaded bolts for removable attachment of the arm.

8. A method as in claim 7 further comprising the step of choosing and attaching a tool arm of an appropriate length to the tool so that the user can position himself on an interior side of the windshield and then apply pressure against the windshield and behind the crack with one arm, thereby opening the crack, while concurrently using his other arm to reach around a side of the windshield to grab the tool arm and thereafter pull the positioned repair tool along the opened crack.

9. A method as in claim 7 wherein the tool arm telescopes in length.

* * * * *